United States Patent
Sun et al.

(10) Patent No.: US 10,430,434 B2
(45) Date of Patent: Oct. 1, 2019

(54) MANAGING TRANSFORMED SNAPSHOTS IN A STORAGE SYSTEM

(71) Applicant: Delphix Corporation, Menlo Park, CA (US)

(72) Inventors: Hubert Ken Sun, Menlo Park, CA (US); Christopher G. Siden, San Francisco, CA (US); Kyle Cackett, Berkeley, CA (US)

(73) Assignee: Delphix Corporation, Menlo Park, CA (US)

(*) Notice: Subject to any disclaimer, the term of this patent is extended or adjusted under 35 U.S.C. 154(b) by 300 days.

(21) Appl. No.: 15/411,471

(22) Filed: Jan. 20, 2017

(65) Prior Publication Data

US 2017/0206016 A1    Jul. 20, 2017

Related U.S. Application Data

(60) Provisional application No. 62/281,126, filed on Jan. 20, 2016, provisional application No. 62/281,127, filed on Jan. 20, 2016.

(51) Int. Cl.
| | |
|---|---|
| *G06F 12/00* | (2006.01) |
| *G06F 16/25* | (2019.01) |
| *G06F 3/06* | (2006.01) |

(52) U.S. Cl.
CPC .......... *G06F 16/258* (2019.01); *G06F 3/067* (2013.01); *G06F 3/0607* (2013.01); *G06F 3/0661* (2013.01)

(58) Field of Classification Search
CPC ........ G06F 3/065; G06F 3/067; G06F 3/0604; G06F 3/0664; G06F 16/258
See application file for complete search history.

(56) References Cited

U.S. PATENT DOCUMENTS

| | | | |
|---|---|---|---|
| 7,334,095 B1* | 2/2008 | Fair | G06F 3/0607 |
| | | | 711/161 |
| 7,757,056 B1* | 7/2010 | Fair | G06F 3/0605 |
| | | | 711/162 |
| 8,150,808 B2 | 4/2012 | Zha et al. | |
| 8,548,944 B2 | 10/2013 | Yueh | |
| 9,396,074 B2 | 7/2016 | Stewart et al. | |
| 9,921,769 B2* | 3/2018 | Aron | G06F 3/0626 |
| 10,235,088 B1* | 3/2019 | Baruch | G06F 3/065 |
| 2005/0010592 A1* | 1/2005 | Guthrie | G06F 17/30067 |
| 2005/0246397 A1* | 11/2005 | Edwards | G06F 16/10 |
| 2005/0246503 A1* | 11/2005 | Fair | G06F 16/10 |
| | | | 711/147 |

(Continued)

*Primary Examiner* — Prasith Thammavong
(74) *Attorney, Agent, or Firm* — Fenwick & West LLP

(57) ABSTRACT

A storage system performs transformations of data stored as source snapshots to obtain transformed snapshots. The storage system stores relations between source snapshots, for example, parent child relationships. The storage system analyzes relationships between source snapshots to determine relationships between transformed snapshots. The storage system creates a transformed snapshot based on a source snapshot. The storage system traverses the graph representing source snapshots to identify ancestor or descendants of the source snapshots that were previously transformed. The storage system determines the transformed snapshots corresponding to the ancestor and descendant source snapshots and relates them to the newly created transformed snapshot.

21 Claims, 11 Drawing Sheets

(56) References Cited

U.S. PATENT DOCUMENTS

| | | | |
|---|---|---|---|
| 2008/0104139 A1* | 5/2008 | Xu | G06F 3/0608 |
| 2009/0265516 A1* | 10/2009 | Prabhu | G06F 3/0608 |
| | | | 711/161 |
| 2010/0185587 A1* | 7/2010 | Lovinger | G06F 16/119 |
| | | | 707/660 |
| 2016/0224797 A1 | 8/2016 | Schrock et al. | |
| 2017/0315878 A1* | 11/2017 | Purohit | G06F 16/27 |
| 2018/0364932 A1* | 12/2018 | Aron | G06F 3/0617 |

\* cited by examiner

MANAGING TRANSFORMED SNAPSHOTS IN A STORAGE SYSTEM

CROSS REFERENCES TO RELATED APPLICATIONS

This application claims the benefits of U.S. Provisional Application No. 62/281,126, filed on Jan. 20, 2016 and U.S. Provisional Application No. 62/281,127, filed on Jan. 20, 2016, each of which is incorporated by reference in its entirety.

BACKGROUND

This invention relates to storage systems in general and in particular, to managing transformations of data stored in snapshots in a storage system.

Data stored in systems such as file systems or database systems is often transformed for various reasons. For example, if an application associated with the data is upgraded, the new version of the application may require different format of certain fields. Accordingly, the data of these fields may have to be transformed to conform to the requirements of the new version of the software.

Such transformation is typically performed using instructions stored in scripts. Several applications and systems, for example, database systems are often complex and require help from experts for development and testing of the transformation script as well as for managing execution of the transformation scripts. Execution of such transformations is further complicated by the fact that the system may be a production system that is constantly in use. Execution of these transformations may require the system to be made unavailable for significant periods of time. Enterprises typically cannot afford to take production systems offline for long periods of time. As product release cycles shorten, transformation of data is required more and more frequently. As a result, conventional techniques for performing transformations are often expensive and take significant amount of time and resources.

SUMMARY

To address the needs unmet by existing storage technologies, embodiments of the invention perform transformations of data stored in snapshots. A storage system stores a plurality of snapshots and parent-child relationships between snapshots. A snapshot may share data blocks with one or more other snapshots. The storage system maintains links representing relationships between snapshots. A link relates a particular snapshot with another snapshot created using data of the particular snapshot. For example, if a snapshot S2 is created from the data of another snapshot S1, the relationship between S1 and S2 is represented as a parent-child link, where S1 is the parent of S2 and S2 is the child of S1.

The storage system stores transformed snapshots such that each transformed snapshot is obtained by transforming data of a source snapshot. The storage system receives a request to perform the transform operation on a first source snapshot. The storage system generates a first transformed snapshot by transforming data of the first source snapshot. The storage system determines relations between the first transformed snapshot and previously created transformed snapshots as follows. The storage system identifies a second source snapshot connected to the first source snapshot via one or more links, such that the second source snapshot was previously transformed to obtain a second transformed snapshot. For example, the storage system may traverse parent-child links from the first source snapshot to find an ancestor or a descendant that was previously transformed.

If the storage system identifies such a second source snapshot, the storage system relates the first transformed snapshot with the second transformed snapshot. The storage system sends information describing relations between transformed snapshots for presentation via a user interface. For example, a user interface of a client device may show the first transformed snapshot being associated with the second transformed snapshot. These relations allow building a logical hierarchy of the transformed snapshots.

The features and advantages described in this summary and the following detailed description are not all-inclusive. Many additional features and advantages will be apparent to one of ordinary skill in the art in view of the drawings, specification, and claims.

Figure 1:
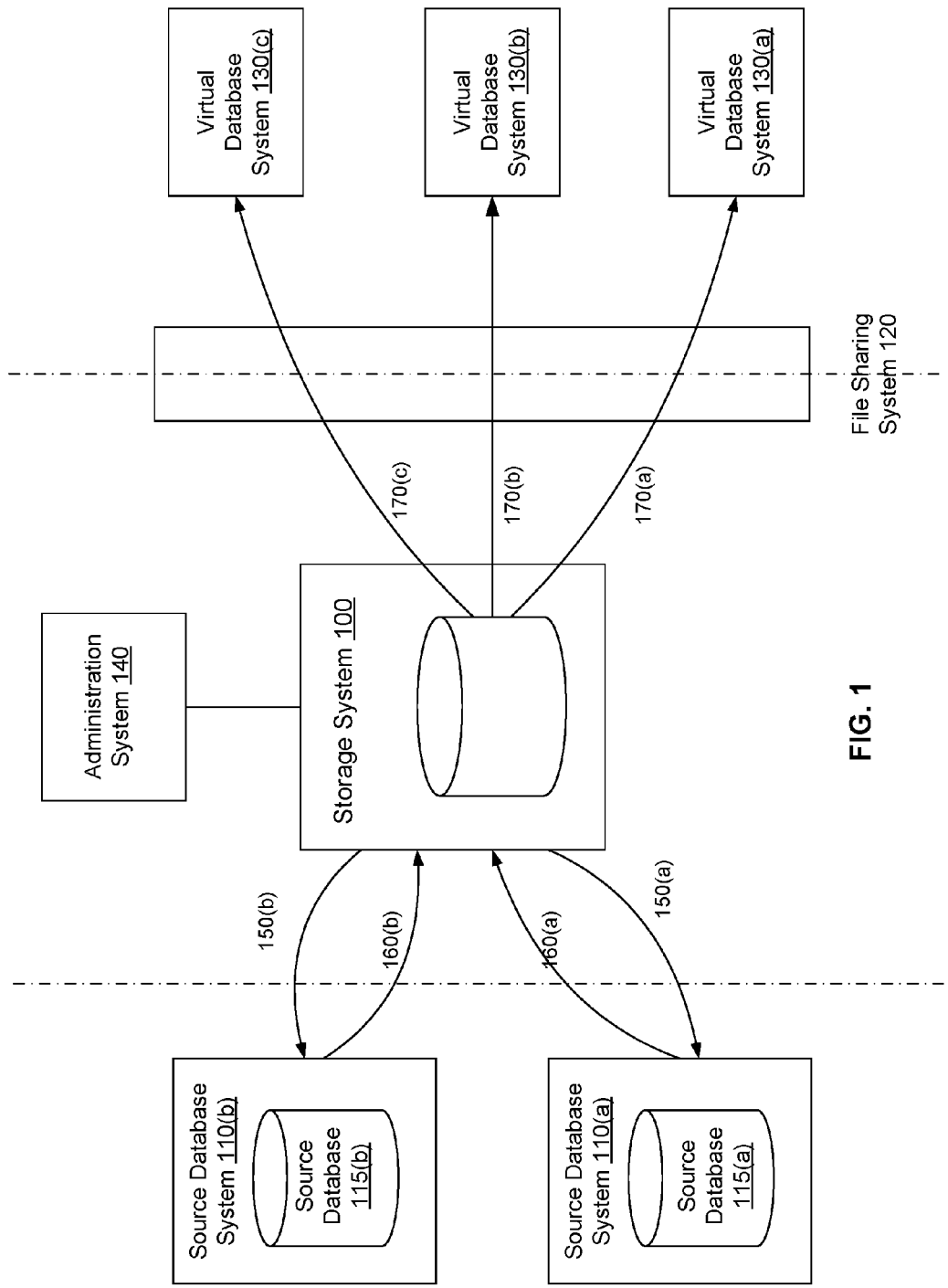
FIG. 1 is diagram illustrating copying of information from a source database to a storage system for provisioning as virtual databases, according to an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments manage transformations of data stored as snapshots in a storage system. The snapshots may represent point-in-time copies of data received from another system, for example, a production database system. A snapshot may share data blocks with other snapshots. For example, a child snapshot may be created from a parent snapshot and may share all data blocks of the parent snapshot. The data of the child snapshot may be modified. Virtual databases may be created from data stored in snapshots. Techniques disclosed herein may be used to transform data stored in virtual databases. Virtual databases share database blocks with other virtual databases. Virtual databases can be used to perform transform operations on snapshots if the snapshot stores data using a database format. For example, transform operations expressed using database commands can be executed on virtual databases.

Virtual Databases

Storage systems store multiple point-in-time copies of a source database using snapshots. Sharing of data blocks across snapshots allows efficient storage of the point-in-time copies of the source database. Virtual databases corresponding to points in time of the source database are provisioned using the storage system. Virtual database systems are described in U.S. patent application Ser. No. 12/603,541 filed on Oct. 21, 2009, now issued as U.S. Pat. No. 8,150,808, which is incorporated by reference herein in its entirety. Storage systems may be used for other purposes, such as for storing point in time copies of file systems for purposes of taking backups of file systems. Backup systems based on stored snapshots of data are described in U.S. patent application Ser. No. 13/183,131 filed on Jul. 14, 2011, now issued as U.S. Pat. No. 8,548,944, which is incorporated by reference herein in its entirety.

A virtual database created for a point in time is stored as a set of files that contain the information of the database as available at that point in time. Each file includes a set of database blocks stored in a snapshot and the data structures for referring to the database blocks. A database block is a data block that conforms to a format of a database and can be processed by a database system. For example, a database block may include metadata describing data of the data block. Database blocks corresponding to database system offered by different vendors may conform to different formats. A virtual database may be created on a database server by creating the database files for the source database corresponding to the state of the source database at a previous point in time, as required for the database server.

The files of the virtual database are made available to the database server using a file sharing mechanism, which links the virtual database to the appropriate database blocks stored on the storage system. The process of making the virtual database available to a database server is called "provisioning" the virtual database. Multiple virtual databases can be provisioned based on the state of the source database at the same point in time.

FIG. 1 is a diagram illustrating copying of information from a source database to a storage system for provisioning as virtual databases, according to an embodiment of the invention. The source database systems 110 manage data for an organization. The storage system 100 retrieves data associated with databases from one or more source database systems 110 and stores the data in an efficient manner, further described below. A database administrator user interface allows a database administrator to perform various actions supported by the storage system 100.

In response to a request from the administration system 140, or based on a predefined schedule, the storage system 100 may send a request 150 for data to a source database system 110. The source database system 110 responds by sending information stored in the source database as a stream of data 160. The request 150 is sent periodically and the source database system 110 responds by sending information representing changes of data stored in the source database since the last response 160 sent by the source database system 110. The storage system 100 receives the data 160 sent by the source database system 110 and stores the data. The storage system 100 stores the information efficiently, for example, by keeping versions of database blocks that have changed and reusing database blocks that have not changed.

To create a virtual database, the storage system 100 creates files that represent the information corresponding to the source database system 110 at a given point in time. The storage system 100 exposes 170 the corresponding files to a virtual database system 130 using a file sharing system 120. The virtual database system 130 runs a database server that can operate with the files exposed 170 by the storage system 100. Hence, a virtual copy of the source database is created for the virtual database system 130 for a given point in time in a storage efficient manner.

A database block may be shared between different files, each file associated with a different virtual database. In particular, a database block is shared if the corresponding virtual database systems 130 are only reading the information in the database block and not writing to the database block. In one embodiment, the virtual database manager 330 makes copies of the database blocks only if necessary. For example, a particular database block may be shared by multiple virtual databases that read from the same database block. But if one of virtual database systems 130 attempts to write to the database block, a separate copy of the database block is made because the writing operation causes that database block to be different for the virtual database corresponding to that virtual database systems 130 than it is for the other virtual databases.

Containers of Transformed Snapshots

In an embodiment, the storage system 100 maintains storage, update, and retrieval of information associated with one or more timeflows corresponding to a snapshot or a virtual database. The storage system 100 stores information describing one or more time points along the timeflows, sequence change numbers and transaction logs associated with updates or modifications to the VDB files, snapshots of the files at a subset of the time points along the timeflows, and the like. A representation of a timeflow stores information describing changes performed on a source database or a VDB along a time line. The storage system 100 maintains a representation called a container for storing and encapsulating snapshots and VDBs for a timeflow. A container may store entities such as virtual databases, snapshots, or point-in-time copies of a source system. Although the techniques disclosed herein are illustrated using snapshots, the techniques are applicable to other entities such as virtual databases and point-in-time copies of source systems stored in snapshots.

Management of timeflows is described in U.S. patent application Ser. No. 14/324,485 filed on Jul. 7, 2014, which is incorporated by reference herein in its entirety. Management of timeflows is described in U.S. patent application Ser. No. 14/324,485 filed on Jul. 7, 2014, which is incorporated by reference herein in its entirety. Management of secure containers storing masked data is described in US. Patent Application No. 62/111,953 filed on Feb. 4, 2015, which is incorporated by reference herein in its entirety.

In an embodiment, the container that stores the snapshots with data that is not yet transformed is called a source container and a container that stores snapshots with transformed data is called a transformed container. The storage system may store rule defining the time and processes for transforming data of a source container. For example, a rule may specify a schedule for transforming entities stored in a source container to generate corresponding transformed entities for the transformed container.

Figure 2:
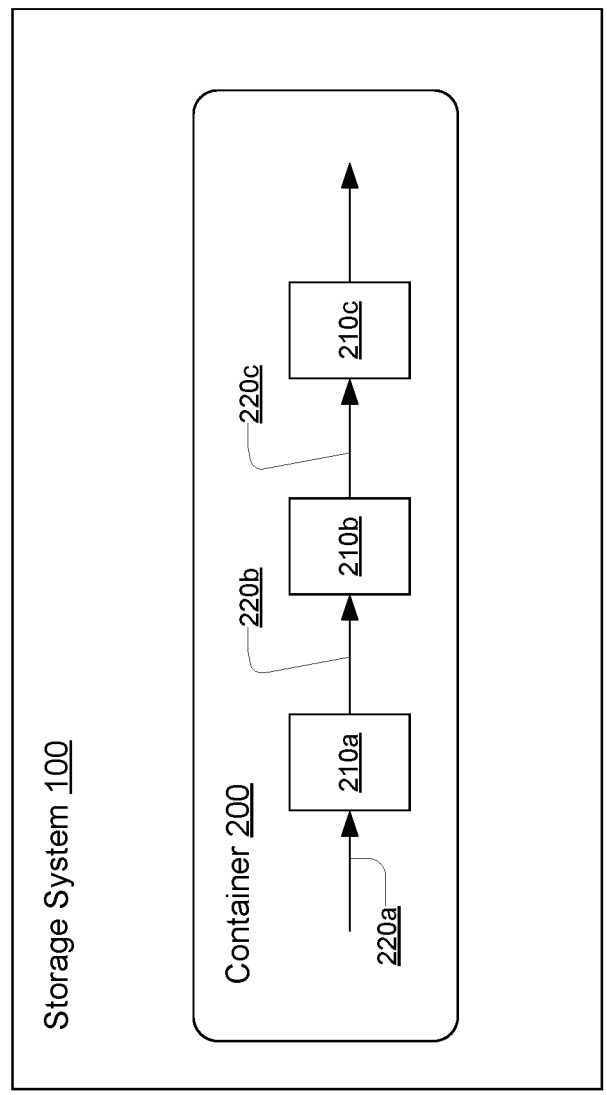
FIG. 2 illustrates a container for storing snapshots, according to an embodiment of the invention.

FIG. 2 illustrates a container for storing snapshots, according to an embodiment of the invention. FIG. 2 shows the container 200 including three snapshots 210a, 210b, and 210c. However, the container 200 may include more or fewer snapshots than those indicated in FIG. 2. Entities in a container may be related by links 220. FIG. 2 shows parent-child links 220 between snapshots. For example, the link 220b indicates that snapshot 210a is a parent of the snapshot 210b. A snapshot 210a is a parent of snapshot 210b if the snapshot 210b was created based on data of snapshot 210 as and there was no other snapshot in between snapshot 210a and 210b.

In an embodiment, the storage system 100 stores a graph representation of snapshots stored in a container where each node represents a snapshot 210 and an edge represents a parent-child link 220 between two snapshots. In an embodiment, the graph representing the parent child relationships between snapshots of a container is a tree such that each snapshot has a single parent snapshot although the snapshot may have multiple child snapshots.

The storage system 100 can identify multiple branches that are distinct by traversing the child links starting from a snapshot. A branch is a sequence of snapshots obtained by traversing the child links starting from a snapshot. Two branches obtained by traversing the child links from a snapshot may have no overlap. Alternatively, two branches obtained by traversing the child links from a snapshot may have a prefix of the sequence of snapshots corresponding to the branch that overlap. However any two branches obtained by traversing the child links from a snapshot are distinct since they have at least one snapshot that is distinct.

A source container may be associated with a transformed container and transformed snapshots generated from the snapshots of the source container are included in the transformed container. A container may be associated with rules for transforming the snapshots stored in the container. A rule may specify that snapshots that satisfy certain criteria should be transformed to generate a transformed container. For example, a rule may specify that the latest snapshot at the end of each month is transformed to generate a transformed snapshot. Accordingly, intermediate snapshots may be created in a month but only the last snapshot of the month is used for generating a transformed snapshot. Alternatively, the storage system 100 may receive explicit requests to generate transformed snapshots based on the source snapshots of a source container. The storage system 100 may receive the requests for generating transformed snapshots from source snapshots in an order that may be different from the order in which the corresponding source snapshots were created. The storage system 100 identifies the parent and child snapshots of the transformed snapshot in the transformed container based on the parent-child relationships between source snapshots of the source container.

Different types of transform operations may be performed on a source snapshot. A transform operation may mask a subset of data stored in a source snapshot to generate a snapshot storing masked data. For example, a table of a virtual database may store sensitive information such as credit card numbers and a transform operation may be used to mask the sensitive information stored in the table. The transformation operation generates a masked virtual database that can be provided to developer or testers for debugging certain issues in a source database.

A transform operation may be used to port data of a file system or database from one operating system to another operating system. For example, an operating system O1 may store data in little endian format and another operating system O2 may store data using big endian format. The storage system 100 may store a snapshot comprising data stored in a file system processed using operating system O1. The storage system 100 transforms the snapshot to generate a transformed snapshot that can be processed using operating system O2. The corresponding transform operation performs byte swapping operations on the data stored in the source snapshot to convert data represented in little endian format to data represented in big endian format (or vice versa).

A transform operation may transform data of a snapshot or a VDB processed using a version V1 of an application or system to become compatible with a different version V2 of the application or system. For example, a virtual database may store data that is compatible with a particular version of a database system provided by a vendor. The storage system 100 transforms data of that virtual database to become compatible with a newer version of the database or application. The transformed data is stored in a transformed VDB that can be processed by the newer version of the database. Accordingly, the transform operation allows for the upgrades of databases or data processed by any application. The transform operation for an upgrade operation may be specified as a script that is designed based on the application or system that processes the data. For example, vendors of an application or system may specify upgrade operations to be performed to be able to use a newer version of the application or system. The script represents these upgrade operations.

The techniques disclosed herein may be used to perform a transform operation that allows cross database (or cross application) migration. For example, the storage system 100 may store data in a virtual database or snapshot that is compatible with a database system or application offered by a vendor X. The storage system 100 receives and executes a transform operation or script that transforms the data of the virtual database or snapshot to generate a transformed VDB or snapshot that is compatible with a database system or application offered by a different vendor Y. Accordingly, the storage system 100 performs a cross database migration or cross application migration.

System Architecture

Figure 3:
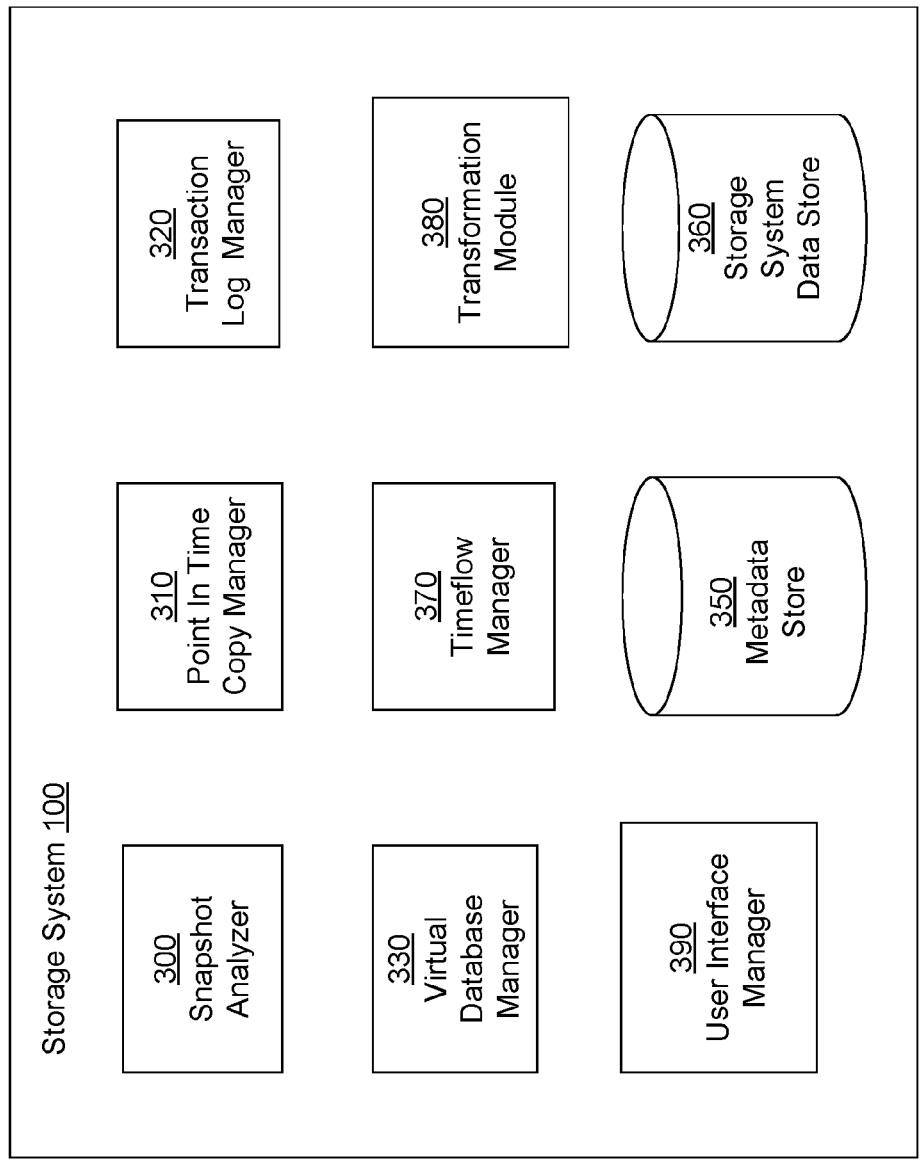
FIG. 3 illustrates the architecture of a storage system for managing transformed snapshots, in accordance with an embodiment of the invention.

FIG. 3 illustrates the architecture of a storage system for creating secure virtual databases, in accordance with an embodiment of the invention. The storage system 100 includes a point-in-time copy manager 310, a transaction log manager 320, a virtual database manager 330, a metadata store 350, a timeflow manager 370, a transformation module 380, a storage system data store 360, a snapshot analyzer 300, and a user interface manager 390. In alternative configurations, different and/or additional modules can be included in the storage system 100. Furthermore, functions performed by a particular module may be performed by other modules than those indicated herein.

The point-in-time copy manager 310 interacts with a source database system 110 (or a source system) by sending a request to the source database system 110 to retrieve information representing a point-in-time copy of the source database 115 (or data of the source system). The point-in-time copy manager 310 stores the data obtained from the source database 115 in the storage system data store 360. The data retrieved by the point-in-time copy manager 310 corresponds to database blocks (or pages) of the database being copied from the source database. After a first point-in-time copy request to retrieve information stored in source database 115, a subsequent point-in-time copy is received in a second request. The data collected in the first request is combined with the data collected in a second request to reconstruct a copy of the source database corresponding to a point in time at which the data was retrieved from the source database 115 for the second request.

The transaction log manager 320 sends request to the source database system 110 for retrieving portions of the transaction logs stored in the source database system 110. The data obtained by the transaction log manager 320 from the source database system 110 is stored in the storage system data store 360. In one embodiment, a request for transaction logs retrieves only the changes in the transaction logs in the source database system 110 since a previous request for the transaction logs was processed. The database blocks retrieved by a point in time copy manager 310 combined with the transaction logs retrieved by the transaction log manager 320 can be used to reconstruct a copy of the source database corresponding to times in the past in between the times as which point-in-time copies are made.

The virtual database manager 330 receives requests for creation of a virtual database for a virtual database system 130. The request for creation of a virtual database may be sent by a database administrator using the administration system 140 and identifies a source database system 110, a virtual database system 130, and includes a past point-in-time corresponding to which a virtual database needs to be created. The virtual database manager 330 creates the necessary files and data structures corresponding to the virtual database being created and shares the files with the virtual database system 130. The database administrator for a virtual database system 130 may be different from a database administrator for the source database system 110.

The storage system data store 360 stores data obtained from the source database systems 110. The storage system data store 360 stores various point-in-time copies associated with different points in time obtained from the source database systems 110. The point-in-time copies of a source database may share database blocks. For example, if a database block does not change between two points in time T1 and T2, the point-in-time copies associated with T1 and T2 may share the database block. The storage system data store 360 also stores transaction logs obtained from the source database systems 110. The storage system data store 360 stores data structures representing virtual databases created by the storage system 100.

A point in time copy of a source system is stored as a snapshot. A snapshot may share data blocks with other snapshots. For example if a snapshot S1 is created as a child of snapshot S2, snapshot S2 shares data blocks with S1. The snapshots S1 and S2 share data blocks that were not modified in any one of S1 or S2.

The metadata store 350 stores metadata describing snapshots. In particular, the metadata store 350 stores the time at which each snapshot is created. The metadata store 350 maintains parent-child relationships between snapshots. If the storage system 100 creates a snapshot S1 corresponding to data received from a source database system and subsequently, creates the next snapshot S2 based on the subsequent set of data received from the source database (without any snapshots created in between S1 and S2 based on data received from the source database), the snapshot S1 is a parent of snapshot S2 and correspondingly snapshot S2 is a child of snapshot S1. Similarly, of the source system 100 creates a copy S' of a snapshot S, the snapshot S is a parent of snapshot S' and correspondingly snapshot S' is a child of snapshot S.

The relationships between the snapshots are represented as a graph in the metadata store 350. The graph comprises nodes and edges between nodes representing relationships between the nodes. An entity may be a snapshot or a point-in-time copy of a source database, or a virtual database. The metadata store 350 stores different types of edges. For example, the metadata store 350 stores associations between source snapshots and transformed snapshots allowing the storage system 100 to identify the source snapshot used to create a transformed snapshot. In an embodiment, the metadata store 350 stores one graph for representing parent-child relationships between source snapshots and another graph for representing parent-child relationships between transformed snapshots.

The timeflow manager 370 maintains storage, update, and retrieval of information associated with one or more timeflows corresponding to a virtual database or a snapshot. The timeflow manager 370 stores information describing one or more time points along the timeflows, sequence change numbers and transaction logs associated with updates or modifications to the VDB files, snapshots of the files at a subset of the time points along the timeflows, and the like. According to an embodiment, a representation of a timeflow stores information describing changes performed on a source database or a VDB. In an embodiment, the changes are stored in a storage efficient manner. For example, at various point-in-time copies (or snapshots) of the data of the source database or VDB is stored such that one or more database blocks are shared across the snapshots. In particular, database blocks that do not change between two consecutive snapshot and database blocks that are updated are copied before the updates are made. In an embodiment, the information describing the changes also comprises transaction logs representing changes made in the time duration between capturing of two point-in-time copies.

The timeflow manager 370 maintains a representation called a container for storing and encapsulating snapshots and VDBs for a timeflow. In an embodiment, the container that stores unsecure snapshots/VDBs with unmasked sensitive data is called an unsecure container and a container that stores secure snapshots/VDBs with masked sensitive data is called secure container. Management of timeflows is described in U.S. patent application Ser. No. 14/324,485 filed on Jul. 7, 2014, which is incorporated by reference herein in its entirety.

The transformation module 380 transforms data stored in a source snapshot by applying transformation functions to the data and creating a transformed snapshot. A transformed snapshot created by transforming data of a source snapshot may share data blocks with the source snapshot. For example, if only a portion of data of the source snapshot is transformed, the transformed snapshot may share data blocks that store data that is not transformed.

An example of a transformation function is a masking function applied for obfuscating data. This may include, but is not limited to, masking out digits, replacing names from a dictionary, or mathematical transformations. As an example, the transformation module 380 performs masking by replacing either a portion of a number (i.e., a string of digits) with one or more characters. For example, if a number represents a social security number or a credit card number, the transformation function may replace a prefix of the number with a character, such as 'x'. Accordingly, the transformation module 380 replaces a number "123 456" with "xxx 456."

In an embodiment, the transformation module 380 performs masking by using a dictionary to map a term to another term. A dictionary may provide mappings from names people to different names. For example, the transformation module 380 may use a dictionary to replace all occurrences of "Mark" with "Michael", all occurrences of "Mary" with "Nancy" and so on. The transformation module 380 may mask numbers by performing certain mathematical transformation. For example, each digit may be replaced by the next digit in order of increasing value, such as replacing 0 by 1, 1 by 2, 2 by 3, 3, by 4, and so on and replacing 9 by 0. Accordingly, number "239" is replaced by "340". These are examples of masking functions and various other masking functions may be used by the transformation module 380. For example, the transformation module 380 may use cryptographic functions that map a value to another value from which decrypting the original value is not possible.

As described above, the transformation module 380 masks data for creating secure snapshots. In an embodiment, the database storage system invokes the transformation module 380 to mask the sensitive data obtained from a source database. The database storage system creates a VDB from a snapshot and the transformation module 380 executes one or more database commands, for example SQL (structure query language) commands to replace data of the VDB with masked data. For example, if a database table T1 of the VDB includes a column credit_card_number storing sensitive data, the data of the column may be masked by executing a command "update T1 set credit_card_number=masking_function(credit_card_number, seed)" where "seed" is an input seed value used by the masking function.

The snapshot analyzer 300 analyzes snapshots to determine metadata describing the snapshots. For example, if the transformation module 380 creates a transformed snapshot T from a source snapshot S, the snapshot analyzer 300 analyzes metadata of various snapshots associated with snapshot S to determine metadata describing the snapshot T. The snapshot analyzer 300 determines relationships between snapshot T and other transformed snapshots based on relationships between snapshot S and other source snapshots. The snapshot analyzer 300 sends the information describing metadata of the snapshots to the user interface manager 390.

The user interface manager 390 configures user interfaces to present metadata describing the snapshots and relationships between various snapshots and sends the user interfaces for presentation via a client device. In an embodiment, the user interface manager 390 shows relationships between snapshots based on relationships inferred by the snapshot analyzer 300. For example, if the snapshot analyzer 300 determines that snapshot T1 is a parent of snapshot T, the user interface manager 390 configures a user interface that shows a relationship between snapshots T1 and T, for example, an arrow connecting snapshot T1 with snapshot T. Similarly, if the snapshot analyzer 300 determines that snapshot T is a parent of snapshots T1 and T2, the user interface manager 390 configures a user interface that shows a relationship between snapshots T and T1 and T2, for example, an arrow connecting snapshot T with snapshot T1 and another arrow connecting snapshot T with snapshot T2.

Creating Transformed Snapshots

Figure 4:
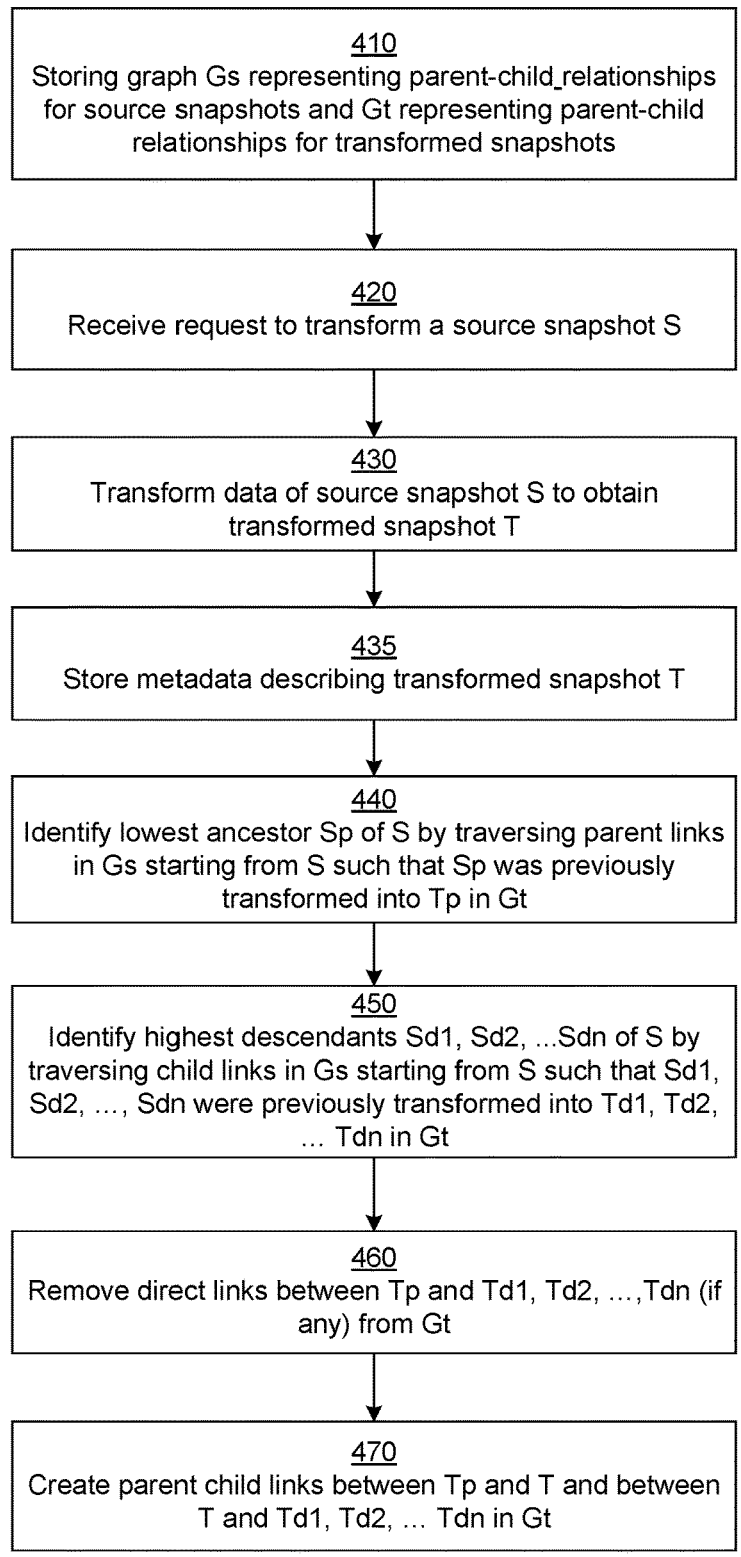
FIG. 4 is a flowchart of a process for identifying relationships between transformed snapshots, according to an embodiment of the invention.

FIG. 4 is a flowchart of a process for identifying relationships between transformed snapshots, according to an embodiment of the invention. The steps of the process illustrated in FIG. 4 may be performed in an order different from that shown in FIG. 4. Furthermore, the steps may be performed by modules different from those indicated herein.

The metadata store 350 stores 410 relationships between various snapshots. For example, the metadata store 350 stores a graph Gs representing relationships between source snapshots and another graph Gt representing relationships between transformed snapshots. In an embodiment, the relationships stored in graphs Gs and Gt may be parent child relationships. The relationships may be stored as an undirected graph. Alternatively, the graphs Gs and Gt may store parent and child links. The parent link points from a child to the parent of the child snapshot and allows the storage system to identify ancestors of a snapshot by traversing the parent links starting from the snapshot. The child link points from a parent snapshot to each child snapshot. The storage system can traverse the child links to identify descendants of a snapshot.

The metadata store 350 also stores an association between each source snapshot and corresponding transformed snapshot obtained by transforming data of the source snapshot. This association allows the storage system to determine whether a source snapshot was transformed previously. Also, the association allows the storage system to determine the transformed snapshot corresponding to a source snapshot.

The transformation module 380 receives 420 a request to transform the data of a source snapshot. The request identifies the source snapshot and may identify a transformed snapshot for storing transformed data and a transformation script or transformation operation to be performed on the data of the source snapshot. The request may identify a subset of data that needs to be transformed if applicable. For example, the request may identify one or more tables of a database stored in the source snapshot that need to be transformed. Alternatively, the transformation script may identify the subset of data that needs to be transformed. For example, a command of the transformation script may identify the subset of data that is processed by the command.

The transformation module 380 transforms 430 the data of snapshot S to obtain a transformed snapshot T. If the transformation module 380 receives a transformation script for performing the transformation, the transformation module 380 executes the operations of the transformation script using the source snapshot S. The transformation module 380 provides information identifying the transformed snapshot T to the snapshot analyzer 300 for determining metadata describing the transformed snapshot T.

The snapshot analyzer 300 determines metadata describing the transformed snapshot T and stores 435 the metadata information in the metadata store 350. The snapshot analyzer 300 stores metadata indicating that the transformed container T is based on source snapshot S. The snapshot analyzer 300 indicates the date of creation of the data underlying the transformed snapshot T as the date of creation of source snapshot S. The snapshot analyzer 300 determines relations between the transformed snapshot T and other transformed snapshots that were created before the transformed snapshot T.

In an embodiment, the snapshot analyzer 300 traverses the graph Gs of source snapshots to determine relations of transformed snapshots in the graph Gt. The snapshot analyzer 300 traverses the graph Gs of source snapshots starting from the node S and away from the node S along the links of the graph Gs. The snapshot analyzer 300 identifies snapshots in graph Gs that were previously used to create transformed snapshots. To identify the snapshots, the snapshot analyzer 300 traverses the links of the graph Gs starting from the source snapshot and away from the source snapshot S and uses the identified snapshots to determine the relations between transformed snapshot T and other transformed snapshots of graph Gt.

In an embodiment, the snapshot analyzer 300 traverses parent-child links to reach ancestors of the source snapshot S in the graph Gs. Accordingly, the snapshot analyzer 300 identifies 440 the lowest ancestor Sp of source snapshot S such that a transformed snapshot Tp was generated from Sp. The snapshot analyzer 300 identifies the lowest ancestor by traversing the parent links starting from the snapshot S until the first ancestor snapshot is identified that was previously transformed. The snapshot analyzer 300 marks the first ancestor snapshot identified as the lowest ancestor Sp. The snapshot analyzer 300 determines that transformed snapshot Tp is associated with transformed snapshot T.

The snapshot analyzer 300 traverses parent-child links starting from source snapshot S to identify descendants of S. Accordingly, the snapshot analyzer 300 identifies 450 the highest descendants Sd1, Sd2, . . . , and Sdn of S obtained by traversing child links in Gs starting from S such that the source snapshots Sd1, Sd2, . . . , and Sdn were previously transformed into transformed snapshots Td1, Td2, . . . , and Tdn in graph Gt. The snapshot analyzer 300 determines that transformed snapshot T is associated with the transformed snapshots Td1, Td2, . . . , and Tdn. In an embodiment, the snapshot analyzer 300 identifies descendants by performing a graph traversal, for example, depth first graph traversal or breadth first graph traversal of graph Gs. If the snapshot analyzer 300 identifies a descendant source snapshot that was transformed while traversing a branch of descendants starting from a source snapshot, the snapshot analyzer 300 selects that descendant source snapshot and stops the traversal along that branch. Accordingly, the snapshot analyzer 300 selects the highest descendants along a branch.

The snapshot analyzer 300 removes 460 any direct parent-child links between transformed snapshot Tp and transformed snapshots Td1, Td2, . . . , and Tdn in Gt. The snapshot analyzer 300 creates parent-child links between transformed snapshots Tp and T and between transformed snapshots T and transformed snapshots Td1, Td2, . . . , and Tdn in Gt. The snapshot analyzer 300 removes 460 removes these direct links because a new node representing a snapshot is introduced in the graph and as a result, these links do not connect their respective nodes directly.

The snapshot analyzer 300 creates 470 parent-child links that connect transformed snapshot Tp as parent of transformed snapshot T and transformed snapshot T as parent of transformed snapshots Td1, Td2, . . . , and Tdn. The snapshot analyzer 300 modifies the graph Gt to add these links and stores the modified graph Gt in the metadata store 350.

If the snapshot analyzer 300 determines that none of the ancestors of the source snapshot were transformed to obtain a transformed snapshot for the transformed container, the storage system 100 does not assign any parent to the transformed snapshot corresponding to the source snapshot. Similarly, if the snapshot analyzer 300 determines that none of the descendants of the source snapshot were transformed to obtain a transformed snapshot of the transformed container, the storage system 100 does not assign any child snapshots to the transformed snapshot corresponding to the source snapshot.

Figure 5:
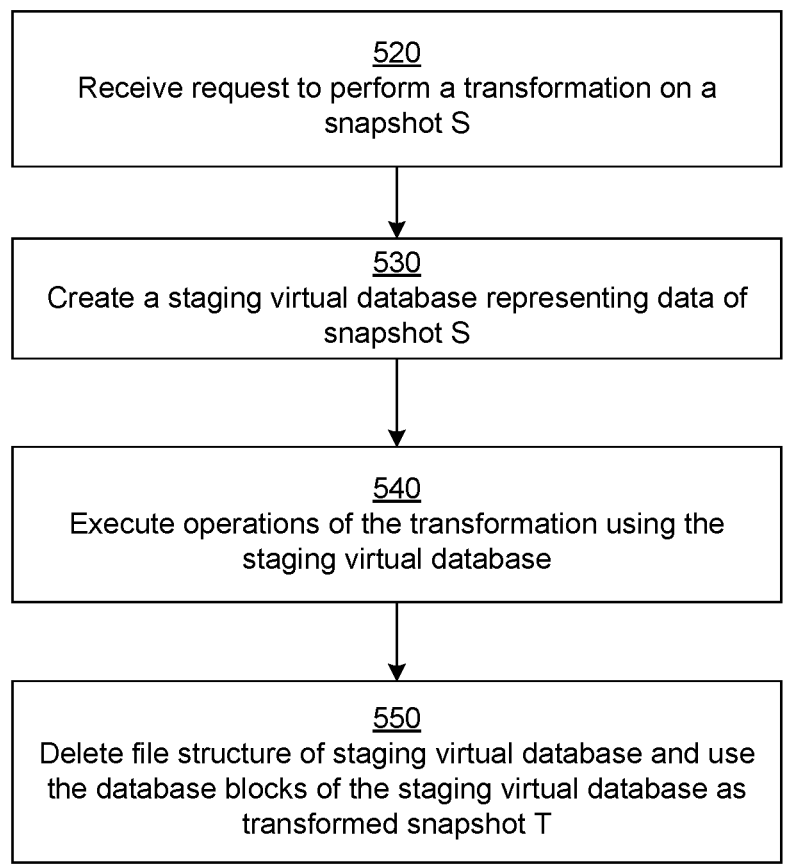
FIG. 5 is a flowchart of a process for transforming a snapshot using a staging virtual database, according to an embodiment of the invention.

If the snapshot stores a data representing a source database, the transformation operations may be specified as database commands. The storage system 100 creates a staging virtual database to interface with the data of the snapshot and performs the transform operations using the staging virtual database. FIG. 5 is a flowchart of a process for transforming a snapshot using a staging virtual database, according to an embodiment of the invention. The steps of the process illustrated in FIG. 5 may be performed in an order different from that shown in FIG. 5. Furthermore, the steps may be performed by modules different from those indicated herein.

The transformation module 380 receives a request to perform a transformation of a snapshot, for example, snapshot S. The transformation module 380 creates a staging virtual database representing data of the snapshot S. The staging virtual database creates a set of files that point at data blocks of the snapshot S. The transformation module 380 performs the requested transformation operations using the staging virtual database. The staging virtual database provides a database interface to the data of the snapshot S. Accordingly, transformation operations including database operations may be performed on the data of the snapshot S. Examples of database operation that can be performed by the storage system on the staging virtual database include data manipulation language (DML) commands specified using a database query language, for example, the structured query language (SQL). These include commands to update a table, insert new rows in a table, delete rows of a table, add new table, delete a table, and so on.

After the transformation module 380 performs the transformations, the transformation module 380 may delete the file structure created for the staging virtual database. Deleting the file structure of the staging database does not affect the data of the transformed snapshot S. The transformation module 380 provides the transformed snapshot S to the system that requested the transformed snapshot.

The process shown in FIG. 5 shows one mechanism for performing transformations of snapshots. The mechanism shown in FIG. 5 is useful if the transformation operations can be expressed as database operations and at least a portion of the data of the snapshot S is structures as a database. In other embodiments, the snapshot S stores data of other types of applications, for example, a backup application and the transformation module 380 creates a file structure of that type of application instead of the file structure of the virtual database. The remaining steps of the process are as illustrated in FIG. 5 and described above.

Figure 6A:
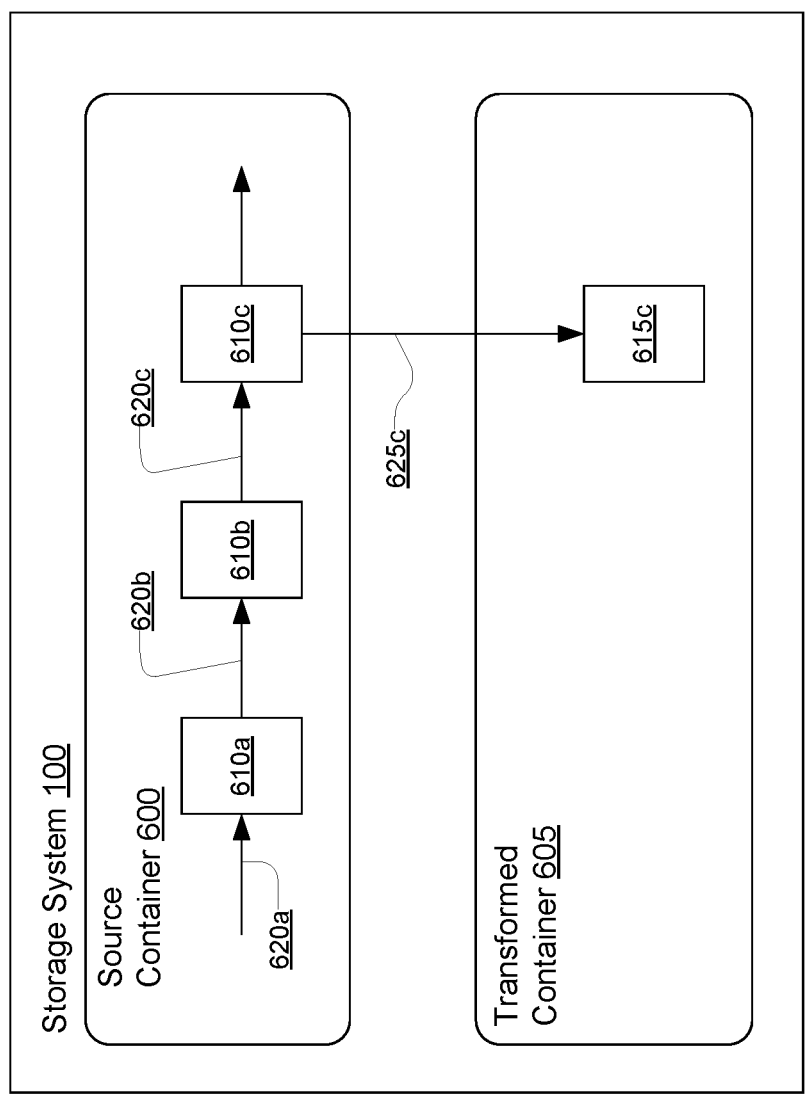
FIGS. 6A-6C show an example illustrating the steps for identifying relationships between transformed snapshots, according to an embodiment of the invention.
Figure 6B:
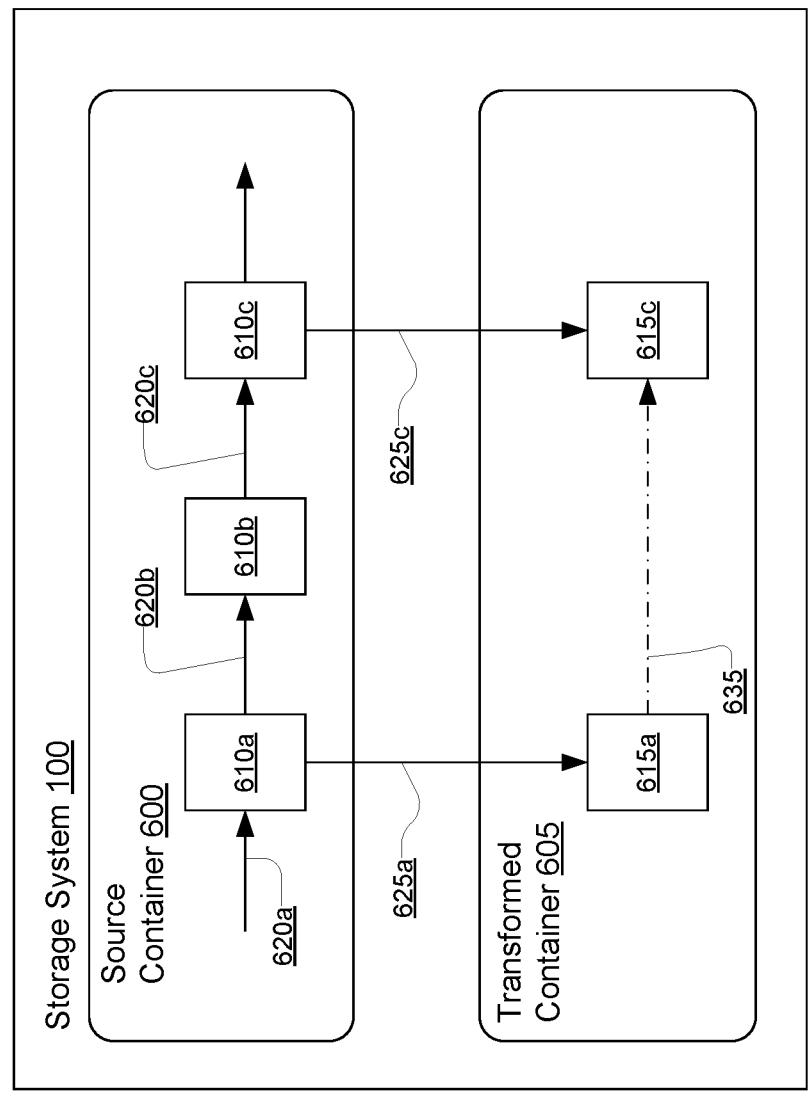
Figure 6C:
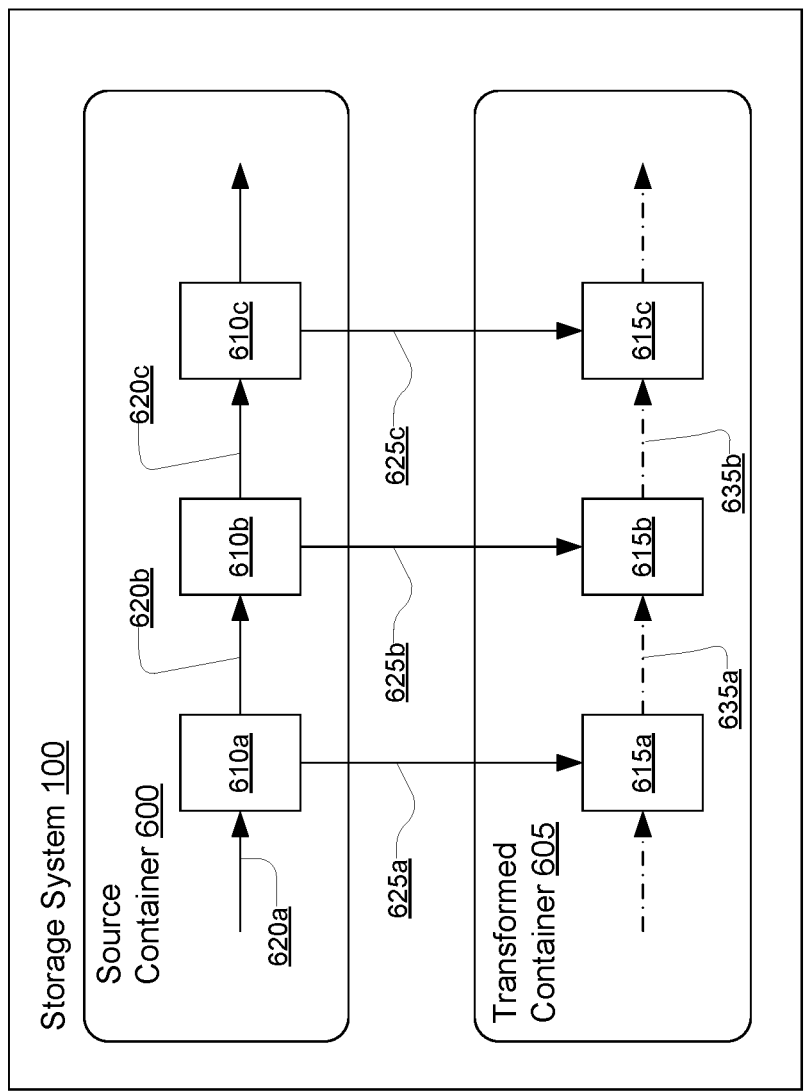

FIGS. 6A-6C show an example illustrating the steps for identifying relationships between transformed snapshots, according to an embodiment of the invention. The storage system 100 includes a source container 600 comprising source snapshots 610a, 610b, and 610c. The storage system 100 includes a transformed container 605 associated with the source container 600. The transformed container 605 stores transformed snapshots obtained by applying certain transform operation(s) to the source snapshots of the source container. The graph of source snapshots and relations between the source snapshots of the source container 600 is referred to as a graph Gs. The graph of transformed snapshots and relations between the transformed snapshots of the transformed container 605 is referred to a graph Gt. Although the nodes of the graphs Gs or Gt described herein represent snapshots stored in the storage system 100, the nodes can represent point-in-time copies of a source database received by the storage system 100 or virtual databases created by the storage system 100.

The storage system 100 receives requests to perform the transform operation on source snapshots of the source container. The request to perform the transform operation identifies the source snapshot to be transformed. The order in which the storage system 100 receives requests to perform the transform operation may be different from the order in which the source snapshots are created. Accordingly, the order in which the storage system 100 creates the transformed snapshots may be different from the order in which the storage system creates the source snapshots.

As shown in FIG. 6A, the storage system 100 first receives a request to generate a transformed snapshot by applying the transform operation to source snapshot 610c. The storage system 100 applies the transform operation to source snapshot 610c to obtain the transformed snapshot 615c. Since the transformed snapshot 615c is the first transformed snapshot added to the transformed container 605, the transformed snapshot 615c does not have any parent or child snapshots associated with it.

As shown in FIG. 6B, the storage system 100 next receives a request to generate a transformed snapshot by applying the transform operation to source snapshot 610a. The storage system 100 applies the transform operation to source snapshot 610a to obtain the transformed snapshot 615a. The storage system 100 traverses ancestors of the snapshot 610a by following parent links of the graph Gs starting from the snapshot 610a. Since the storage system 100 does not find any ancestor of the snapshot 610a that was transformed to obtain a transformed snapshot, the storage system 100 does not assign any parent to the transformed snapshot 615a.

The storage system 100 traverses the descendants of the source snapshot 610a and determines that descendant 610c was transformed to obtain the transformed snapshot 615c of the transformed container. Therefore, the storage system 100 assigns the transformed snapshot 615c as the child of the transformed snapshot 615a in the transformed container 605 as shown by the link 635.

As shown in FIG. 6C, the storage system 100 next receives a request to generate a transformed snapshot by applying the transform operation to source snapshot 610b. The storage system 100 applies the transform operation to source snapshot 610b to obtain the transformed snapshot 615b. The storage system 100 traverses ancestors of the source snapshot 610b by following parent links of the graph Gs starting from the snapshot 610a. The storage system 100 determines that the ancestor 610a of the source snapshot 610b was transformed to obtain the transformed snapshot 615a of the transformed container. The storage system 100 traverses the descendants of the source snapshot 610b to determine that the descendant 610c was transformed to obtain the transformed snapshot 615c of the transformed container.

The transformed container deletes the link 635 between the transformed container 615a and 615c. The storage system 100 assigns the transformed snapshot 615a as the parent of the transformed snapshot 615b in the transformed container 605 as indicated by the link 635a. The storage system 100 assigns the transformed snapshot 615c as the child of the transformed snapshot 615b in the transformed container 605 as indicated by the link 635b.

Figure 7A:
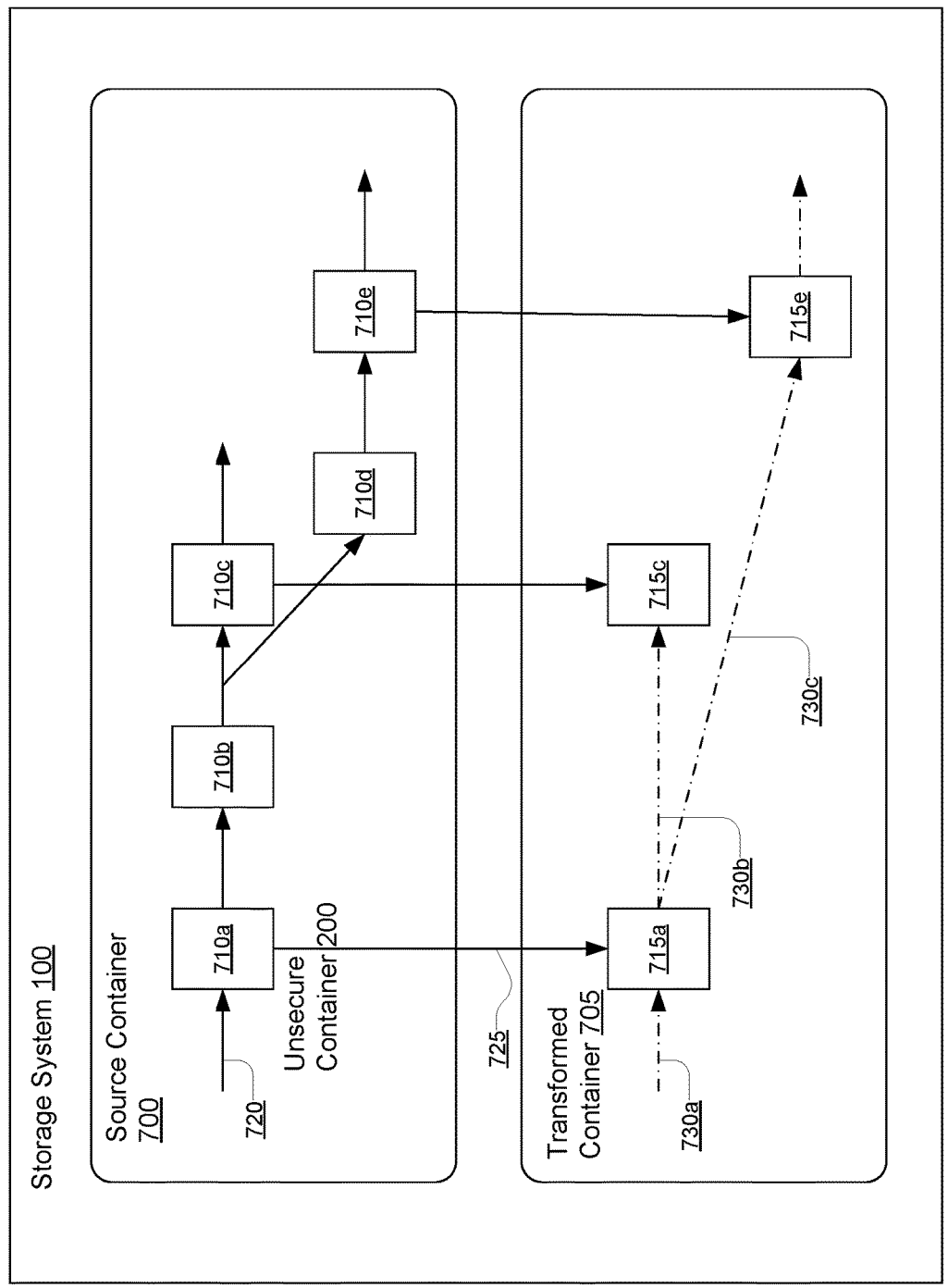
FIGS. 7A-7C show an example illustrating the steps for identifying relationships between transformed snapshots in which a snapshot has multiple child nodes, according to an embodiment of the invention.
Figure 7B:
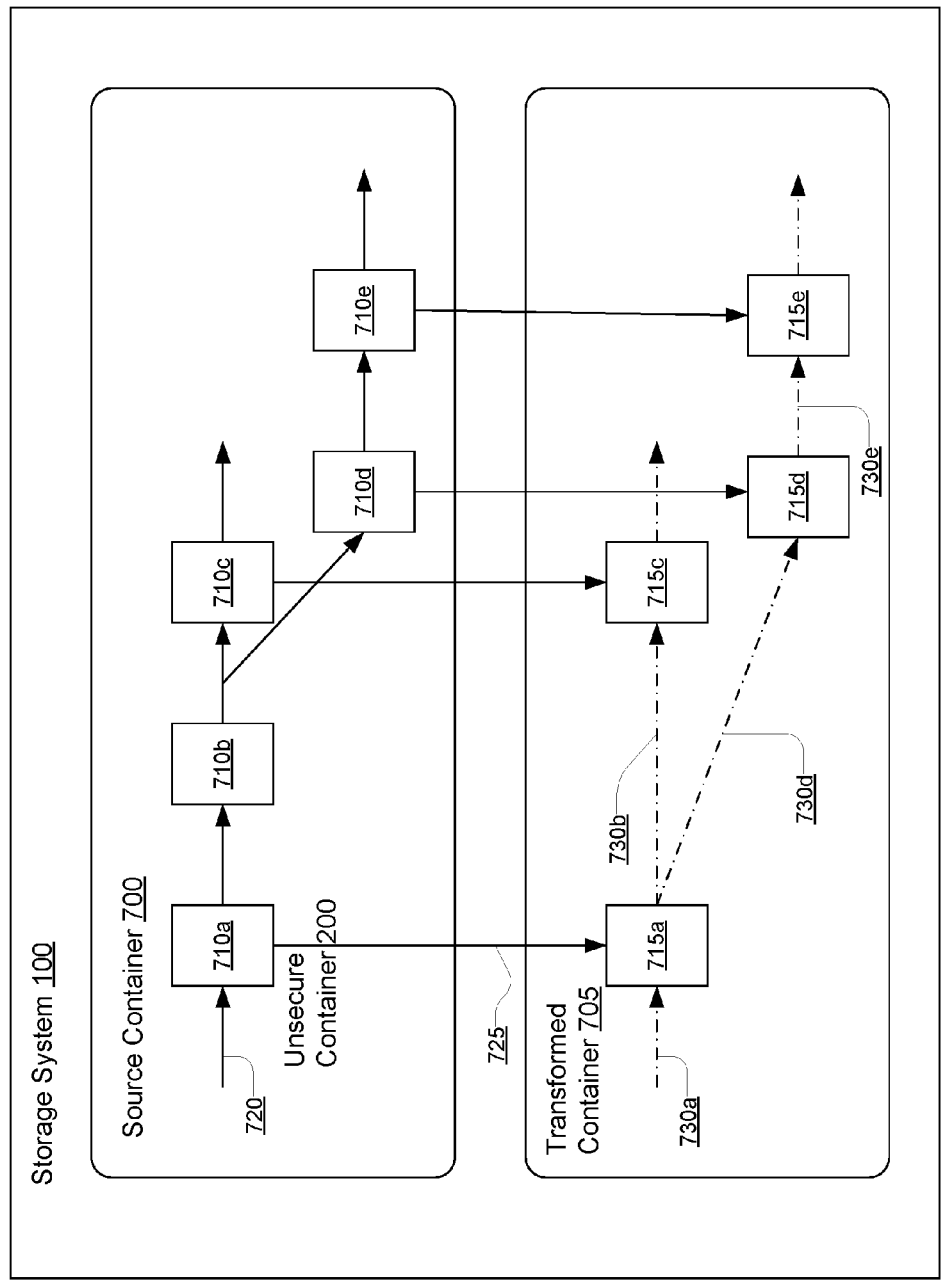
Figure 7C:
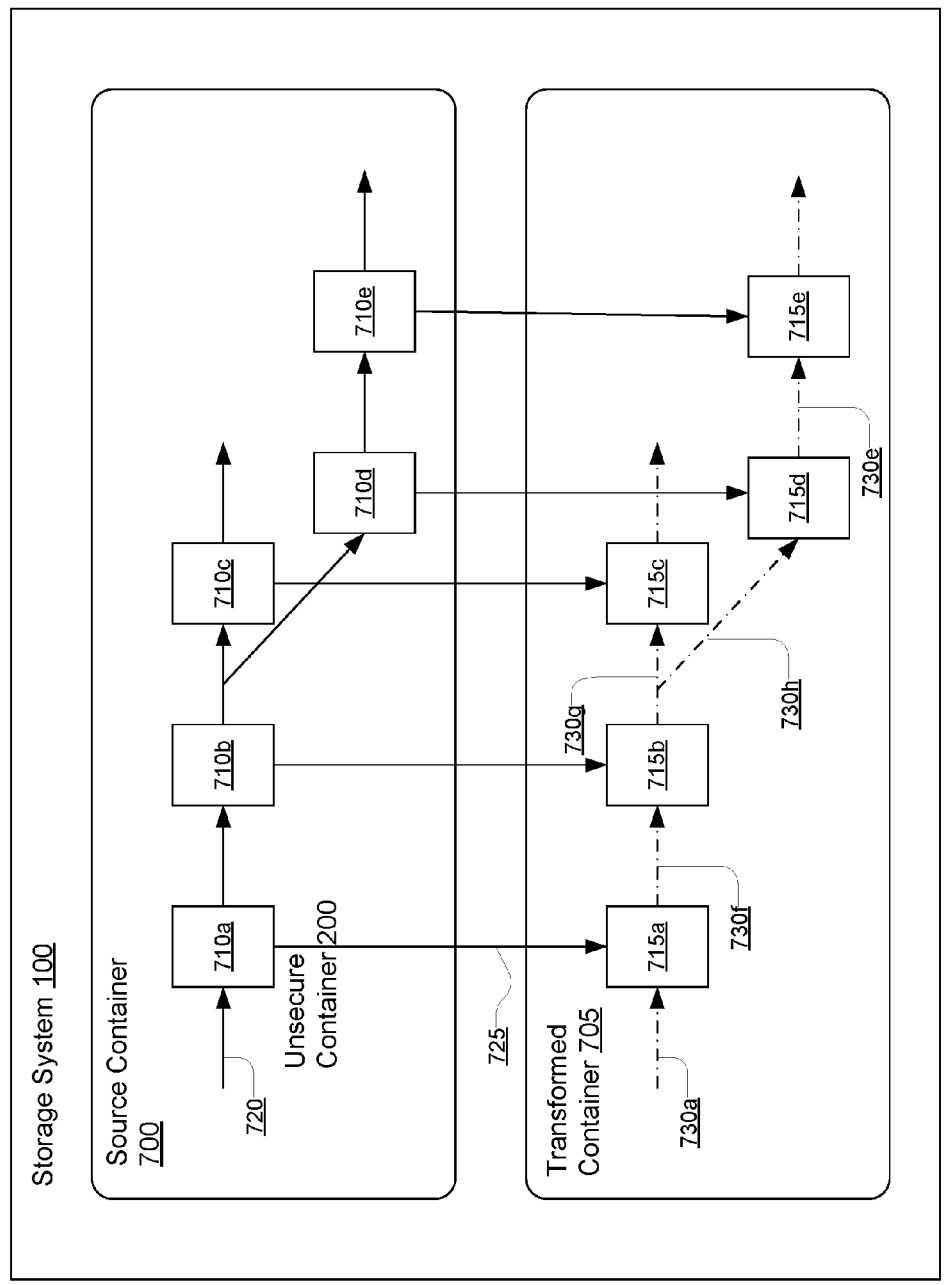

In the example illustrated in FIG. 6, each snapshot has a single child. However, a snapshot may have multiple child snapshots. FIGS. 7A-7C show an example illustrating the steps for identifying relationships between transformed snapshots in which a snapshot has multiple child nodes, according to an embodiment of the invention. As shown in FIG. 7, a source snapshot may be used as input to create two or more distinct branches of descendant snapshots. Accordingly, source container 700 includes source snapshot 710b as a child of snapshot 710a. Source snapshot 710b has two child snapshots, 710c and 710d. The snapshot 710d has a child snapshot 710e.

The transformed container 705 includes transformed snapshots obtained by performing a transform operation on source snapshots of the source container 700. The transformed container 705 includes transformed snapshots based on a subset of source snapshots of the source container. These include transformed snapshot 715a obtained by transforming source snapshot 710a, transformed snapshot 715c obtained by transforming source snapshot 710c, and transformed snapshot 715e obtained by transforming source snapshot 710e. The link 730b relates transformed snapshot 715a to transformed snapshot 715c and link 730c relates transformed snapshot 715a to transformed snapshot 715e.

As shown in FIG. 7b, the storage system 100 receives a request to transform source snapshot 710d. The source snapshot transforms source snapshot 710d to generate transformed snapshot 715d. The snapshot analyzer 300 determines the relations between the transformed snapshot 715d and other transformed snapshots of the transformed container as follows. The snapshot analyzer 300 traverses the parent links starting from source snapshot 710d to identify ancestors of the source snapshot 710d. The snapshot analyzer 300 identifies source snapshot 710a as the lowest ancestor of source snapshot 710d obtained while traversing the parent links starting from source snapshot 710d such that the source snapshot 710a was previously transformed to a transformed snapshot 715a. Similarly, the storage system 100 traverses the descendants of the source snapshot 710d to determine that the descendant snapshot 710e is the highest descendant along a branch of descendants starting from the source snapshot 710d such that 710e was transformed to obtain the transformed container 715e.

The snapshot analyzer 300 deletes the parent-child link 730c between the transformed snapshots 715a. The snapshot analyzer 300 creates links indicating transformed snapshot 715e as child of transformed snapshot 715d and the transformed snapshot 715d as the child of the transformed snapshot 715a.

As shown in FIG. 7c, the storage system 100 next receives a request to transform source snapshot 710b. The storage system 100 traverses the parent links to select the lowest ancestor source snapshot 710a that was previously transformed. The storage system 100 traverses the child links to identify the 710c as the highest descendant that was transformed along a first branch of descendants starting from source snapshot 710b and 710d as another descendant that was transformed along a second branch of descendants starting from source snapshot 710b.

The storage system 100 removes the links between the transformed snapshot 715a corresponding to the identified ancestor 710a and the transformed snapshots 715c and 715d corresponding to the identified descendants 710c and 710d. These include the link 730b that relates transformed snapshot 715a with transformed snapshot 715c and link 730d that relates transformed snapshot 715a with transformed snapshot 715d. The storage system 100 introduces new links including link 730f connecting the transformed snapshot 715a as the parent of the new transformed container 715b, link 730g connecting the transformed snapshot 715c as the child of the new transformed container 715b, and link 730h connecting the transformed snapshot 715d as the child of the new transformed container 715b.

The storage system 100 saves the modified graph Gt of the transformed container 705. Accordingly, the storage system 100 determines the parent and child snapshots for each new transformed snapshot added to the transformed container 705. The storage system 100 determines the parent and child snapshots for each new transformed snapshot based on the relations between source snapshots of the source container. The parent and child relations between snapshots of each new transformed snapshot added to the transformed container are independent of the order of the creation of the transformed snapshots within the transformed container.

Additional Configuration Considerations

Embodiments disclosed herein describe transformation of snapshots. A storage system may create a VDB based on a snapshot. VDBs share data blocks with other VDBs in the same manner that snapshots share data blocks with other snapshots. Accordingly, all techniques disclosed herein for replicating snapshots can be used for transforming data of VDBs. For example, the processes shown FIGS. 6 and 7 can be performed by replacing the term snapshot with the term VDB.

A database comprises data stored in a computer for use by computer implemented applications. A database server is a computer program that can interact with the database and provides database services, for example, access to the data stored in the database. Database servers include commercially available programs, for example, database servers included with database management systems provided by ORACLE, SYBASE, MICROSOFT SQL SERVER, IBM's DB2, MYSQL, and the like. A database may be implemented using a database model, for example, a relational mode, object model, hierarchical model or network model.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one. The singular also includes the plural unless stated otherwise.

Upon reading this disclosure, those of skill in the art will appreciate still additional alternative structural and functional designs for a system and a process for creating secure virtual databases from point-in-time copies of source databases stored in a storage manager. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for transforming snapshots, the method comprising:
   storing, in a storage system, a plurality of source snapshots, wherein a source snapshot shares data blocks with one or more other source snapshots;
   maintaining links representing relationships between source snapshots from the plurality of source snapshots, each link relating a snapshot with another snapshot created using data of the snapshot;
   identifying a set of previously created transformed snapshots associated with a transform operation and stored in the storage system, each transformed snapshot of the set of transformed snapshots obtained by performing the transform operation on data of a respective source snapshot of the plurality of source snapshots to change a format of the respective source snapshot;
   receiving a request to perform the transform operation on a first source snapshot of the plurality of source snapshots;
   generating a first transformed snapshot by transforming data of the first source snapshot;
   determining relations between the first transformed snapshot and the previously created transformed snapshots, the determining comprising:
      identifying a second source snapshot of the plurality of source snapshots, the second source snapshot connected to the first source snapshot via one or more links, and wherein the second source snapshot was transformed to obtain a second transformed snapshot of the previously created transformed snapshots; and
      responsive to identifying the second source snapshot, storing at least one link between the first transformed snapshot and the second transformed snapshot based upon the identified one or more links connecting the first source snapshot and the second source snapshot; and
   sending information describing relations between one or more transformed snapshots for presentation via a user interface.

2. The method of claim 1, wherein identifying the second source snapshot comprises traversing links from the first source snapshot and selecting a nearest source snapshot that was previously transformed to generate a transformed snapshot.

3. The method of claim 2, wherein the second source snapshot is connected to the first source snapshot by at least a plurality of links.

4. The method of claim 1, wherein a link is a parent-child link that associates a parent source snapshot with a child source snapshot, wherein the child source snapshot was created from the parent source snapshot.

5. The method of claim 4, wherein identifying the second source snapshot comprises traversing the parent-child links starting from the first source snapshot to identify a lowest ancestor of the first source snapshot that was previously transformed to generate a transformed snapshot.

6. The method of claim 4, wherein identifying the second source snapshot comprises traversing the parent-child links starting from the first source snapshot to identify a highest descendant of the first source snapshot that was previously transformed to generate a transformed snapshot.

7. The method of claim 4, wherein identifying the second source snapshot comprises traversing the parent-child links starting from the first source snapshot to identify a plurality of descendants, wherein each of the plurality of descendants is a highest descendant of the first source snapshot along a particular branch that was previously transformed to generate a transformed snapshot.

8. The method of claim 1, wherein the transform operation masks at least a subset of data of a source snapshot to create a transformed snapshot storing masked data.

9. The method of claim 1, wherein the transform operation receives as input a source snapshot storing data that can be processed by a first version of an application and generates a transformed snapshot storing data that can be processed by a second version of the application.

10. The method of claim 9, wherein the application is a database system.

11. The method of claim 1, wherein the transform operation receives as input a source snapshot storing data that can be processed by an application configured to execute on a first operating system and generates a transformed snapshot storing data that can be processed by an application configured to execute on a second operating system.

12. The method of claim 1, wherein the transform operation receives as input a source snapshot storing data formatted for processing by a first application and generates a transformed snapshot storing data that is formatted for processing by a second application.

13. The method of claim 1, wherein transforming data of a source snapshot comprises:
creating a copy of the source snapshot;
creating a virtual database representing data of the copy of the source snapshot;
executing the transform operation to modify the virtual database, the transform operation comprising one or more database commands; and
using the data of the modified virtual database as the transformed snapshot corresponding to the source snapshot.

14. A non-transitory computer-readable storage medium storing instructions for:
storing, in a storage system, a plurality of source snapshots, wherein a source snapshot shares data blocks with one or more other source snapshots;
maintaining links representing relationships between source snapshots from the plurality of source snapshots, each link relating a snapshot with another snapshot created using data of the snapshot;
identifying a set of previously created transformed snapshots associated with a transform operation and stored in the storage system, each transformed snapshot of the set of transformed snapshots obtained by performing the transform operation on data of a respective source snapshot of the plurality of source snapshots to change a format of the respective source snapshot;
receiving a request to perform the transform operation on a first source snapshot of the plurality of source snapshots;
generating a first transformed snapshot by transforming data of the first source snapshot;
determining relations between the first transformed snapshot and the previously created transformed snapshots, the determining comprising:
identifying a second source snapshot of the plurality of source snapshots, the second source snapshot connected to the first source snapshot via one or more links, and wherein the second source snapshot was transformed to obtain a second transformed snapshot of the previously created transformed snapshots; and
responsive to identifying the second source snapshot, storing at least one link between the first transformed snapshot and the second transformed snapshot based upon the identified one or more links connecting the first source snapshot and the second source snapshot; and
sending information describing relations between one or more transformed snapshots for presentation via a user interface.

15. The non-transitory computer-readable storage medium of claim 14, wherein identifying the second source snapshot comprises traversing the links starting from the first source snapshot and selecting the nearest source snapshot that was previously transformed to generate a transformed snapshot.

16. The non-transitory computer-readable storage medium of claim 14, wherein a link is a parent-child link that associates a parent source snapshot with a child source snapshot, wherein the child source snapshot was created from the parent source snapshot.

17. The non-transitory computer-readable storage medium of claim 16, wherein identifying the second source snapshot comprises traversing the parent-child links starting from the first source snapshot to identify a lowest ancestor of the first source snapshot that was previously transformed to generate a transformed snapshot.

18. The non-transitory computer-readable storage medium of claim 16, wherein identifying the second source snapshot comprises traversing the parent-child links starting from the first source snapshot to identify a highest descendant of the first source snapshot that was previously transformed to generate a transformed snapshot.

19. The non-transitory computer-readable storage medium of claim 16, wherein identifying the second source snapshot comprises traversing the parent-child links starting from the first source snapshot to identify a plurality of descendants, wherein each of the plurality of descendants is a highest descendant of the first source snapshot along a particular branch that was previously transformed to generate a transformed snapshot.

20. A computer system, comprising:
an electronic processors; and
a non-transitory computer-readable storage medium storing instructions for:
storing, in a storage system, a plurality of source snapshots, wherein a source snapshot shares data blocks with one or more other source snapshots;

maintaining links representing relationships between source snapshots from the plurality of source snapshots, each link relating a snapshot with another snapshot created using data of the snapshot;

identifying a set of previously created transformed snapshots associated with a transform operation and stored in the storage system, each transformed snapshot of the set of transformed snapshots obtained by performing the transform operation on data of a respective source snapshot of the plurality of source snapshots to change a format of the respective source snapshot;

receiving a request to perform the transform operation on a first source snapshot of the plurality of source snapshots;

generating a first transformed snapshot by transforming data of the first source snapshot;

determining relations between the first transformed snapshot and the previously created transformed snapshots, the determining comprising:

identifying a second source snapshot of the plurality of source snapshots, the second source snapshot connected to the first source snapshot via one or more links, and wherein the second source snapshot was transformed to obtain a second transformed snapshot of the previously created transformed snapshots; and responsive to identifying the second source snapshot, storing at least one link between the first transformed snapshot and the second transformed snapshot based upon the identified one or more links connecting the first source snapshot and the second source snapshot; and sending information describing relations between one or more transformed snapshots for presentation via a user interface.

21. A method for transforming data, the method comprising:

storing, in a storage system, a plurality of source entities, wherein a source entity represents data stored as a plurality of data blocks in the storage system, wherein an entity shares data blocks with one or more other entities represented in the storage system;

maintaining links representing relationships between entities from the plurality of source entities, each link relating an entity with another entity created using data of the entity;

identifying a set of previously created transformed entities associated with a transform operation and stored in the storage system, each transformed entity of the set of transformed entities obtained by performing the transform operation on data of a respective source entity of the plurality of source entities to change a format of the respective source entity;

receiving a request to perform the transform operation on a first source entity of the plurality of source entities;

generating a first transformed entity by transforming data of the first source entity;

determining relations between the first transformed entity and the previously created transformed entities, the determining comprising:

identifying a second source entity of the plurality of source entities, the second source entity connected to the first source entity via one or more links, and wherein the second source entity was transformed to obtain a second transformed entity of the previously created transformed entities; and responsive to identifying the second source entity, storing at least one link between the first transformed entity and the second transformed entity based upon the identified one or more links connecting the first source entity and the second source entity; and sending information describing relations between one or more transformed entity for presentation via a user interface.

* * * * *

UNITED STATES PATENT AND TRADEMARK OFFICE
CERTIFICATE OF CORRECTION

| | |
|---|---|
| PATENT NO. | : 10,430,434 B2 |
| APPLICATION NO. | : 15/411471 |
| DATED | : October 1, 2019 |
| INVENTOR(S) | : Sun et al. |

Page 1 of 1

It is certified that error appears in the above-identified patent and that said Letters Patent is hereby corrected as shown below:

In the Claims

Column 20, Claim 20, Line 62, delete "an electronic processors;" and insert --an electronic processor;--, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*